United States Patent [19]

Lilley et al.

[11] Patent Number: 4,995,086

[45] Date of Patent: Feb. 19, 1991

[54] ARRANGEMENT AND PROCEDURE FOR DETERMINING THE AUTHORIZATION OF INDIVIDUALS BY VERIFYING THEIR FINGERPRINTS

[75] Inventors: Robert M. Lilley, Knypersley; Paul J. Ridgway, Congleton, both of United Kingdom

[73] Assignee: Siemens Aktiengesellschaft, Berlin and Munich, Fed. Rep. of Germany

[21] Appl. No.: 244,586

[22] Filed: Sep. 13, 1988

Related U.S. Application Data

[63] Continuation of Ser. No. 47,359, May 5, 1987, abandoned.

[30] Foreign Application Priority Data

May 6, 1986 [EP] European Pat. Off. ........ 86106231.3

[51] Int. Cl.$^5$ ............................................. G06K 9/00
[52] U.S. Cl. .................................... 382/4; 235/380; 235/382; 340/825.34; 356/71; 382/2
[58] Field of Search .................................. 382/2, 4, 5; 340/825.31, 825.32, 825.34; 235/380, 381, 382; 356/71

[56] References Cited

U.S. PATENT DOCUMENTS

| | | | |
|---|---|---|---|
| 3,581,282 | 5/1971 | Altman | 382/2 |
| 3,639,905 | 2/1972 | Yaida et al. | 382/2 |
| 4,123,747 | 10/1978 | Lancto et al. | 340/825.34 |
| 4,151,512 | 4/1979 | Riganati et al. | 340/146.3 E |
| 4,179,686 | 12/1979 | Bonicalzi et al. | 382/2 |
| 4,210,899 | 7/1980 | Swonger et al. | 340/149 R |
| 4,213,638 | 7/1980 | Silverman et al. | 235/381 |
| 4,253,086 | 2/1981 | Szwarcbier | 382/17 |
| 4,322,163 | 3/1982 | Schiller | 356/71 |
| 4,428,670 | 1/1984 | Ruell et al. | 356/71 |
| 4,525,854 | 6/1985 | Bowles et al. | 382/5 |
| 4,581,760 | 4/1986 | Schiller et al. | 382/4 |
| 4,582,985 | 4/1986 | Löfberg | 235/382 |
| 4,684,791 | 8/1987 | Bito | 235/382 |

FOREIGN PATENT DOCUMENTS

| | | |
|---|---|---|
| 0043988 | 1/1982 | European Pat. Off. . |
| 0090377 | 10/1983 | European Pat. Off. . |
| 0142449 | 5/1985 | European Pat. Off. . |
| 0159037 | 10/1985 | European Pat. Off. . |
| 2740483 | 10/1985 | Fed. Rep. of Germany . |

OTHER PUBLICATIONS

IBM Technical Disclosure Bulletin, vol. 18, No. 3, pp. 888-9 (Aug. 1975).

Primary Examiner—Leo H. Boudreau
Assistant Examiner—Joseph Mancuso
Attorney, Agent, or Firm—Mark H. Jay

[57] ABSTRACT

The arrangement uses a portable data carrier in the form of a plastic card, which has several magnetic tracks for containing data. The stored data can consist of the degree of correlation between a fingerprint of the authorized individual and a stored and selected reference signal image and the code number of this reference signal image. Further, use of a so-called characteristic number is possible. A fingerprint detection terminal with a sensor contains a memory in which the selected reference signal image is stored. The sensor compares the actual fingerprint of an individual to be checked with the corresponding reference signal image identified on the plastic card and stored in the fingerprint detection terminal. The thus determined degree of correlation is, in turn, compared to the degree of correlation stored on the plastic card and, as a function of the result of this comparison, an appropriate decision signal is released. The data are written on the plastic card in such a way, that based on the data alone no unambiguous conclusion concerning the identity of the individual is possible.

12 Claims, 2 Drawing Sheets

ARRANGEMENT AND PROCEDURE FOR DETERMINING THE AUTHORIZATION OF INDIVIDUALS BY VERIFYING THEIR FINGERPRINTS

CROSS-REFERENCE TO RELATED APPLICATION

This is a continuation of Ser. No. 047,359 filed May 5, 1987 now abandoned.

BACKGROUND OF THE INVENTION

Use of plastic cards as badges for entering and leaving access controlled areas or as "substitute money" in the form of check cards, bank cards, credit cards etc. is widespread and still increasing because of the automation of financial transaction methods. For storing data these cards in general contain magnetic strips. A significant problem associated with the use of cards of this nature is their unlawful use and the high monetary losses arising as a consequence of this unlawful use. In order to prevent such unlawful use, it is necessary to confirm that the person actually in possession of the card is the person authorized to have it.

It is known to use fingerprint verification systems for identity checks as described in U.S. Pat. No. 4,428,670 or in German Patent No. 27 40 483. In the identification process, the fingerprints are examined for certain characteristics of details of skin structures (island crossings of the dermal grooves, vortices, etc.) and the characteristic sequence of the features compared with a stored quantity and sequence and the identity of an individual determined as a function of them. To this end, terminals with fingerprint sensors are used, which are connected to a central numerical processor because of the large quantity of data involved.

Use of terminals connected to central numerical processors makes widespread use of such an identification system less feasible. In addition, a system using a central numerical processor is susceptible to interferences, expensive and difficult to handle.

A further problem is data security. Thus, when using plastic cards, precautions must be taken to make the stored data inaccessible to unauthorized personnel.

The fact that fingerprint identification systems in use until now attempted to determine the identity of the individual i.e. to derive from the fingerprints themselves the identity of the individual, these identification systems, therefore, ran counter to the desire for data protection in the application of the fingerprint identification systems for check cards, credit cards, etc.

It is therefore one object of the invention to make available an arrangement and a procedure of a high rate of accuracy for determining whether individuals are authorized users of information carrying cards by checking fingerprints independently of a central data processing facility. Another object is that, for reasons of data protection, the arrangement and the process should be such that unambiguous identity determination solely on the basis of fingerprints is not possible.

SUMMARY OF THE INVENTION

In accordance with the invention, a portable data carrier is used for verifying the authorization of an individual. The data carrier can, for example, be a check card on which a magnetic strip is arranged. On this magnetic strip a quantity and sequence of characteristic features of the fingerprint of the authorized person is stored in the form of binary multi-digit numbers. The data are stored in the storage area of the plastic card. In this process, the fingerprints of the authorized individual are determined first, then the fingerprints are examined for characteristic features and the quantity of the data determined in this way reduced and converted into a corresponding numerical word so that an unambiguous conclusion concerning the identity of the individual on the basis of the stored number is not possible.

For verifying the individual, a fingerprint detection terminal is provided, which detects the actual fingerprints of the person to be checked and examines them with respect to characteristic features. Data representing these features are then reduced in the terminal independently of a central processing unit, converted into corresponding data, and compared with the data on the card. Given appropriate approximation or agreement, a signal indicates authorization or unauthorization.

The invention permits use of independently operating handy terminals. They can serve to control entry to and exit from access controlled security areas. Furthermore, it is possible, for example, to assign a device of this kind to each of the automated teller machines customary at banks. Such terminals can also be used to ensure security of financial transactions of any kind. With this, unlawful use, for example, of credit cards can be almost entirely eliminated.

The invention optimally ensures data protection. While it is possible to check the authorization of an individual with a high degree of security and accuracy, identification of the individual based on the determined characteristic features of the fingerprints is, however, not possible.

The data of the detected characteristic features of the fingerprints and stored in reduced form could be that of several individuals. An unambiguous assignment of the data to the individuals is, thus, not possible. The invention, nevertheless, permits checking the authorization of individuals with a very high degree of certainty while the system does not permit unlawful use in attempting to circumvent personal data protection.

BRIEF DESCRIPTION OF THE DRAWINGS

Exemplary and non-limiting preferred embodiments of the invention are shown in the drawings, in which:

FIG. 4 is a block diagram of the system according to the invention; and

FIG. 5 schematically illustrates a second preferred embodiment of the invention.

DETAILED DESCRIPTION OF PREFERRED EMBODIMENTS

Figure 1:
FIG. 1 shows a fingerprint detection terminal in accordance with the invention.

The fingerprint verification system contains a terminal 10, which, for example, can be designed corresponding to FIG. 1 and which functions independently of a central processing unit. The terminal 10 has a sensor area 11 for detecting the fingerprints, further an indicator display 12 and an input keyboard 13. Below the input keyboard is a card reader device 14. In the housing of the terminal 10 is the entire evaluation logic and the associated current supply. A terminal of this nature serves as an independent device for detecting the authorization of individuals by checking their fingerprints.

Potential applications are, for example, as an access control device for security areas, as device for the error free check and control of financial transactions, for example, in conjunction with automated teller machines of credit institutions. Application in the area of purchase credit cards and data registers in retail stores is conceivable.

A fingerprint verification system of this kind can be put into practice in different ways. In a first embodiment, the so-called "characteristic number procedure", characteristic features of the fingerprints of the authorized individual (card holder) are stored on a plastic card 15 or any other portable data carrier. This storage takes place in that with the aid of a sensor as, for instance shown in FIG. 2, a fingerprint of a certain finger, for example, the index finger of the card holder is taken and examined in known manner with repect to characteristic features. After determining a quantity and sequence of characteristic features, the data quantity is reduced to a few significant features. This can, for example, be done in that the features are examined with respect to the number and the kind of unambiguous vortices, arcs, circular arcs, double vortices, crossings and other papillary line forms shown by the fingerprint.

The characteristic features detected in this way are encoded in the form of a multi-digit number.

Each digit of the number, for example, can have assigned to it a certain feature, and the number itself can indicate the frequency of occurrence of this feature. Any other kind of coding method is also possible. In this connection it is only essential that the "characteristic number" obtained in this way describes the fingerprint of the card holder to a sufficient extent.

This "characteristic number" is then stored on the plastic card 15. This can be done in the form of binary numbers in a magnetic track of the plastic card or also in the form of printed bar codes.

For checking authorization (verification), the card holder places his plastic card containing his characteristic number into the card reading device 14 arranged in the terminal. He also places his finger on the sensor surface of the fingerprint sensor 11.

The recognition logic 16 of the terminal now analyzes the fingerprint in a manner similar to the one applied in the original writing of the cards, and in this way obtains a sequence and quantity of characteristic features. For this data sequence a "characteristic number" is established in the same way. In a comparison process, the "characteristic number" thus determined is compared with the characteristic number on the plastic card. The comparison device now determines the similarity between these two numbers, activating a decision signal. This can consist in that on the display 12 of the terminal the word "Error" or the word "Accepted" appears. Instead of the display, it is also possible to activate a red or green indicator light 17.

A further embodiment of the fingerprint verification system called "reference signal image procedure" is described below with reference to FIG. 5.

With the aid of the already described fingerprint sensor 11, the fingerprint of an authorized person is recorded in the actual register process and analyzed by the identification logic 16. The identification logic 16 compares in this process the signal image of the fingerprint of the authorized individual with a given number of, for example, 8 reference or phantom signal images 2/1-2/8 stored in a data storage device 2. These reference signal images 2/1-2/8 represent signal images of characteristic fingerprints, which show differing main characteristics. This means that each signal image contains in principle a main characteristic out of the quantity of the most frequently occurring characteristics of the fingerprints. These reference signal images do not need to correspond to actual fingerprints, they only need to be formed so that a symbol recognition comparison of the signal images of the individual to be registered is possible using these "phantom signal images". This means that in principle any kind of "standard" signal image can be used in this process of comparison, regardless of its actual significance.

The recognition logic now compares the determined obtained signal image of the authorized individual and that of the individual to be detected with the individual reference signal images 2/1-2/8 and determines in this way the "most similar" reference signal image, for example, the image 2/1. Simultaneously, it determines the degree of correlation K between this reference signal image 2/1 and the signal image of the fingerprints of the authorized individual. The number of other characteristics of the selected reference signal image 2/1 and the degree of correlation K are stored on the plastic card 15.

Figure 2:
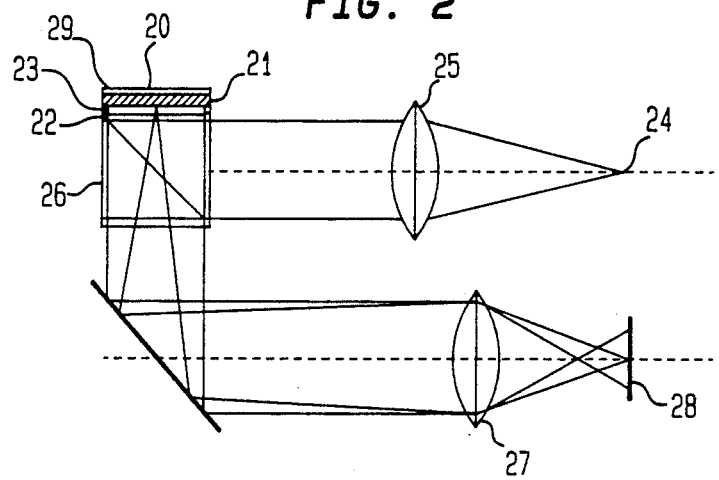
FIG. 2 shows a schematic representation of the structure of a fingerprint sensor used in the terminal.

In the terminal according to FIGS. 1 and 2 in a storage device 2, which can be designed as ROM memory (FIG. 5), the described reference or phantom signal images 2/1-2/8 are stored. After sliding the plastic card into the card reading device 14, the data stored on the card 15 are read and the reference signal image 2/1 characterized or marked on the card is selected from the memory 2 of the terminal on the basis of the marking. The actual signal image of the fingerprint of the individual to be checked is now compared with the reference signal image 2/1 and from this comparison a comparison correlation factor VK determined, which describes the similarity between the actual fingerprint and the phantom signal image. This comparison correlation factor VK is now again compared to the correlation factor K stored on the card 15. With a sufficiently large degree of correspondence, a decision signal is activated.

Advantageously, no actual identification of the individual to be checked takes place. Only a comparison of a limited quantity of data characterizing the fingerprint of the individual to be checked with the quantity of data listed on the card is undertaken. The quantity of data is selected so that an unambiguous identification of an individual solely on the basis of the stored data on the card (be it "characteristic number" or, in the case of the reference signal image procedure, the kind of the reference signal image and the degree of correlation K) is not possible. Several individuals can have such a feature-reduced characteristic number or reference signal image. However, the combination of card and fingerprint yields an extremely high degree of assignment certainty. In this way, a high degree of data protection with respect to the individual is possible.

In one model of the invention, the degree of certainty can be increased further by assigning each individual a personal identification number or PIN. In this case, the individual requesting authorization after having placed the card into the card reading device of the fingerprint detection terminal, inputs via a key pad arranged there the personal identification number PIN. By way of this personal identification number, for example, the extent of authorization can be assigned.

Figure 3:
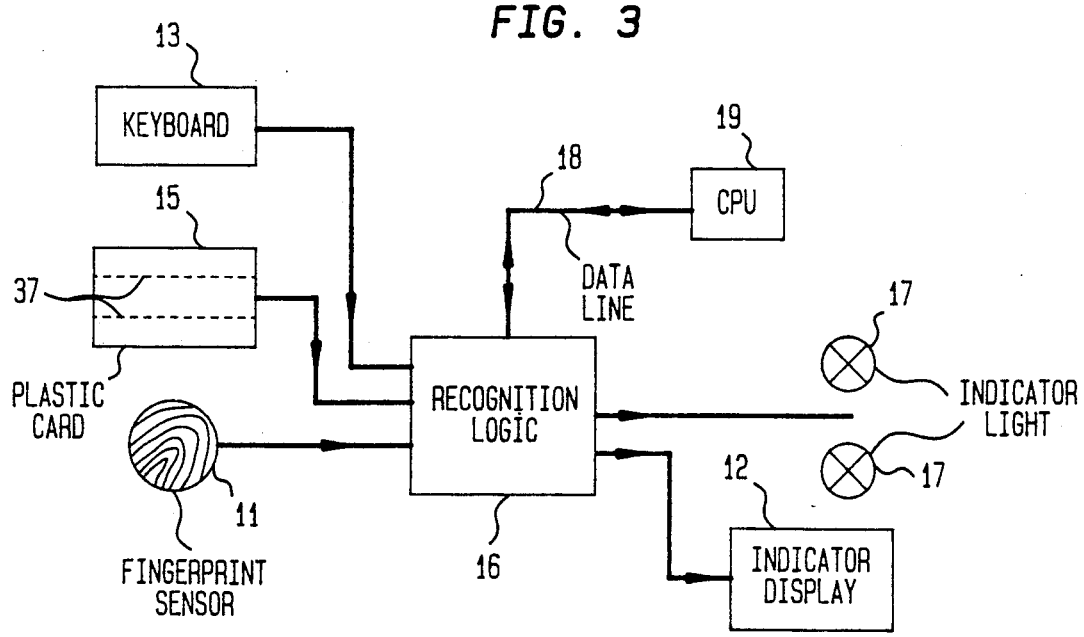
FIG. 3 shows a schematic functional representation of the system according to the invention.

Even though the fingerprint verification system is laid out to work independently of a central processor as a stand-alone terminal, it can, however, if the need arises, be connected over a data line 18 with a central processing unit 19 (FIG. 3). This can, for example, become necessary if the terminal operates in conjunction with automated teller machines of banks. When using the terminals for access control it can be necessary to connect the terminal via a long-distance data line with a center which, for example, monitors optically the access area.

The fingerprint detection terminal is described in detail below in conjunction with the "characteristic number procedure".

The entire structure according to FIG. 4 can be used in similar form for the "reference signal image procedure" (FIG. 5). The entire electronics of the terminal with the appropriate special features are contained in a shockproof housing which, for example, has oblique external faces, so that, for example, drinking cups or similar things cannot be placed on it. The individual scanning and detection devices must also be lockable in order to prevent mischievous destruction of the system.

The sensor as shown in FIG. 2 is used as the fingerprint sensor. The shown sensor, which functions according to the principle of light refraction, which principle can be gathered from U.S. Pat. No. 4,428,670, has as sensor surface 20 an elastic silicon-elastomer layer 21, which serves as contact surface for the finger to be scanned and which, because of its elasticity, adapts to the papillary lines of the fingerprint. The elastomer layer is supported by a transparent planar support plate 22 with the intermediate space between elastomer layer and support plate perhaps being filled with an optically adaptive medium 23, for example oil. The light emitted by a light source 24 illuminates over lenses 25 and a beam splitter 26 from below the elastomer layer and is, corresponding to the course of the papillary lines, refracted at the sensor plane (surface) of the elastomer layer. The reflected image of the sensor plane, in turn, is reproduced via an optic reproduction system 24 on a CCD-image converter and there converted into electrical image signals. The sensor can, for example, consist of a matrix with 256×256 dots with 16 grey shades.

In order to eliminate the influence of external light, and at the same time protect the elastomer layer 21 from wear and tear, the surface of the elastomer layer, onto which the finger to be scanned is intended to be placed, can be coated with a thin metal layer 29. This is also advantageous in terms of scanning certainty, since it permits scanning to be carried out independently of the moisture content of the skin respectively the papillaries. Customarily, in scanning fingerprints of individuals whose skin is very brittle and dry, problems arise otherwise.

The image signals supplied by the CCD-image converter are analyzed with respect to details and features of the fingerprint in evaluation logic 30, which customarily is designed to be microprocessor driven and is connected to a data storage device 31 and a program storage device 32. For this purpose, the fingerprint is initially intermediately stored in its entirety in the form of its electrical signals and subsequently analyzed. With known recognition procedures (MY Chiu, "Shore Walk Algorithms And Its Application To Fingerprint Feature Extraction", July 1981, Siemens RTL, Princeton, N.J., U.S.A. MY Chiu, "Results Of The Shore Walk Algorithm And The Matching Algorithm For A Fingerprint Verification System" Oct. 1981, Siemens RTL, Princeton N.J., U.S.) and given size and resolution of the image converter approximately 40 features can be detected, for example position in the Cartesian system of coordinates (x and y), angle (theta) and the quality coefficient Q of the feature recognition. After the recognition procedure, the data of these 40 features are reduced in a suitable computer algorithm to a 40 bit data quantity. This algorithm detects primarily the relative positions in directions and not their absolute values.

Weighting takes place as a function of the recognition certainty and the determined quality factor. It is possible to use polynomial procedures usual for this purpose with pseudorandom number generators.

The degree of reduction between the data quantity assigned to the features and the actually utilized data quantity depends primarily on the capacity of the used card and the comparison data stored on it, considering the purpose of the intended use.

This reduction process is in principle unidirectional. This means, that an identification of an individual on the basis of the reduced data alone is not possible, because these data intentionally can be assigned to several individuals. In this way, data security to the highest possible degree is ensured.

In order to facilitate the subsequent comparison process, the data quantity reduced to 40 bit form can have the form of a multidigit binary number of the so-called characteristic number, with each feature having assigned to it, for example, a place of the binary number (characteristic number). The values of the individual digits of the number can, for example, indicate the frequency of occurrence of the feature or the numerial weight which is to be assigned to it.

In the subsequent comparison process, the thus determined characteristic number is transmitted to an evaluation control device 33, which compares this characteristic number with a credit card placed into a card reading device and the characteristic number located on it. As a function of a predetermined degree of correlation between the stored characteristic number and the determined characteristic number, a decision signal is generated and the decision subsequently indicated on the display respectively by a signal light. The central evaluation control device 33 contains, among other things, again a program memory 34 and a data memory 35 and controls the peripheral input devices. These are, for example, the card reading device 14, an input keyboard 13 for inputting the personal identification number (PIN) and the display 12. The control of the display can be designed in such a way, that operator control can take place via the display.

Instead of indication on the display, the verification decision, for example, can also be indicated through the indicator light 17, which lights up green or red. To connect to an automated teller machine or to a central monitor device 19 a data line 18 can be used.

As described already, in order to make comparison of the characteristic numbers possible, the terminal contains a card reading device 14, which serves for accepting the card to be read with the characteristic number stored on it. These characteristic number can be arranged on the card in form of a binary number on a magnetic track or also as a bar code.

The characteristic number read in this manner is stored in a data memory 36. Also stored is a control and guide procedure for operator control which indicates on the display via the associated drive device the corresponding operating commands. Depending on the individual application the characteristic number can contain more or less information on the cards regarding the fingerprint.

If the card is a credit card and used for such purpose, it should have three magnetic tracks with one of the tracks serving as data carrier for the characteristic number. The other tracks should be rewritable and carry the actual data.

When the card is used as an access badge for controlled entry to and exit from high security areas, all three tracks on the card can be used as storage for a characteristic number containing more information. The data in this case can be encoded in cipher and each feature can be represented by a data set, defined by the position (xy), the angle (theta) and the quality coefficient (Q). It must be understood, that for each feature approximately 6 bytes are required.

For the described purposes (as controlling entry to and exit from access controlled areas) the detection of 20 features would suffice. This would correspond to 120 bytes. A data quantity of this nature would essentially fill the three tracks of a magnetic card.

Those skilled in the art will understand that changes can be made in the preferred embodiments here described, and that these embodiments can be used for other purposes. Such changes and uses are within the scope of the invention, which is limited only by the claims which follow.

What is claimed is:

1. Fingerprint verification apparatus comprising:
   means for storing an arbitrary non-fingerprint related image;
   means for reading a fingerprint of an individual whose fingerprint is to be verified;
   means for comparing said fingerprint with said arbitrary image and establishing a degree of correlation therebetween;
   means for reading data on a data carrier associated with said individual; and
   means for comparing data read by said data reading means with said determined degree of correlation for verification purposes.

2. The apparatus of claim 1, wherein said data comparing means comprises means for classifying said abstract data into one of a plurality of catagories and for determining a degree of accuracy of said classification.

3. The apparatus of claim 2, wherein each of said catagories is a reference signal image and said degree of accuracy is a numerical correlation factor.

4. The apparatus of claim 1, wherein said data carrier contains data representing a personal identification number and said reading means contains means for reading said personal identification number data.

5. The apparatus of claim 1, wherein the data carrier stores said data in a form which allows said data to be altered.

6. The apparatus of claim 1, wherein said data reading means comprises means for reading multi-digit numeric words.

7. The apparatus of claim 6, wherein said data reading means comprises a bar code reader.

8. The apparatus of claim 1, wherein said reading means comprises means for reading a magnetic strip.

9. The apparatus of claim 1, further comprising an indicator display which is connected to said comparing means.

10. The apparatus of claim 1, further comprising an input keyboard which is connected to said comparing means.

11. The apparatus of claim 1, wherein said fingerprint reading means comprises an elastomeric layer which is mounted for deformation by a finger, means for forming an image of said elastomeric layer, and an image converter connecting said image to electrical information, said elastomeric layer being covered by a layer of metal, thereby protecting said elastomeric layer.

12. The apparatus of claim 11, wherein said image converter comprises a charge-coupled device.

* * * * *